United States Patent Office 3,288,800
Patented Nov. 29, 1966

3,288,800
SCHIFF'S BASES OF 6-AMINO-PENICILLANIC ACID AND PURIFICATION OF 6-AMINO-PENICILLANIC ACID BY THE USE THEREOF
Leon J. Heuser, Princeton, and Noel A. Taylor, Westfield, N.J., assignors to E. R. Squibb & Sons, Inc., New York, N.Y., a corporation of Delaware
No Drawing. Filed May 29, 1962, Ser. No. 198,459
6 Claims. (Cl. 260—306.7)

This invention relates to new derivatives of 6-aminopenicillanic acid and more particularly to Schiff's bases of aldehydes and 6-aminopenicillanic acid and salts thereof, their method of preparation, and their use in the purification of 6-aminopenicillanic acid.

6-aminopenicillanic acid (hereinafter called 6-APA) is a known compound of recognized utility as an intermediate in the preparation of penicillins. Such penicillins are prepared from 6-APA by acylation, employing an acyl chloride corresponding to the acyl radical of the desired penicillin product. The 6-APA is usually prepared either by hydrolysis of a penicillin, such as penicillin G, or directly by fermentation in the absence of a penicillin precursor. In either event, the 6-APA is obtained in solution with various contaminants, so that to recover pure 6-APA the compound must be separated from these contaminants. Unfortunately, however, 6-APA, because of its amphoteric nature, is difficult to recover from an aqueous medium.

It has now been found that if 6-APA (or a salt thereof with a base) is treated with an aldehyde, a Schiff's base is formed which is either substantially water-insoluble, or may be converted to a water-insoluble salt by reaction with a proper base, and hence may be recovered from the aqueous medium, either by extraction with a water-immiscible solvent or by separation of the oily or crystalline product formed.

In its broadest aspects, therefore, the instant invention provides for new chemical compounds which are Schiff's bases of aldehydes and 6-APA and salts thereof. In addition the instant invention provides for a process for preparing such Schiff's bases by reacting 6-APA (or a salt thereof with a base) with an aldehyde, the reaction preferably being conducted in an aqueous medium at a pH in the range of about 3 to about 5, if 6-APA itself is employed as the reagent, and about 6 to about 8, if a basic salt of 6-APA is employed as the reagent. Moreover, the instant invention also provides for a process for purifying 6-APA by preparing a Schiff's base thereof, separating the Schiff's base, and regenerating the 6-APA, as by treatment with an organic base having a greater affinity for the aldehyde than does 6-APA.

To prepare the Schiff's bases of this invention, 6-APA, preferably in an aqueous medium, is treated with the desired aldehyde, the reaction preferably being conducted at a pH of about 3 to about 5, whereby the Schiff's base of 6-APA is formed. Alternatively, the 6-APA can first be converted to a salt thereof with a base, in which event the reaction is preferably conducted at a pH of about 6 to about 8.

Although any aldehyde may be used to prepare the Schiff's bases of this invention, so that such aldehydes as formaldehyde and acetaldehyde are operable, the preferred aldehydes, because of the water-insolubility of the Schiff's bases formed therewith, are those of more than four carbon atoms, as exemplified by alkanals of more than four carbon atoms (e.g., isopentaldehyde, heptaldehyde, octaldehyde, 2-ethylhexaldehyde, nonyl aldehyde, capraldehyde and lauraldehyde); substituted alkanals of more than four carbon atoms, such as halo, hydroxy, nitro and alkoxy substituted alkanals of more than four carbon atoms; aralkanals (e.g., benzaldehyde, phenacetaldehyde, hydrocinnamaldehyde, 2-phenylpropionaldehyde, cuminic aldehyde and 1-naphthaldehyde); substituted aralkanals, such as halo, nitro, hydroxy and alkoxy substituted aralkanals (e.g., p-chlorobenzaldehyde, salicylaldehyde, and o-methoxybenzaldehyde); aralkenals [e.g., phenyl(lower alkenals) such as cinnamaldehyde]; and heterocyclic substituted alkanals (e.g., 2-furaldehyde, 2-thiophenealdehyde and pyridine-4-aldehyde).

The 6-APA employed in the preparation of the Schiff's bases of this invention may be used either as such or in the form of a salt with a base. Although any base may be used and salts with such bases as alkali metals (e.g., sodium and potassium) and amines of relatively low molecular weight (e.g., triethylamine) are operable, the preferred bases are organic amines of more than six carbon atoms, since such bases form water-insoluble salts of the Schiff's bases of this invention and hence aid in the recovery of the Schiff's bases from impurities present in the original aqueous medium. Such amines include alkyl amines of more than six carbon atoms, as exemplified by tert.-octylamine, dodecylamine and tetradecylamine; aralkyl amines, as exemplified by benzyl amine and α-phenethyl amine; and heterocyclic alkyl amines. The salts are prepared in the usual manner by intermixing the base and 6-APA in a neutral or basic aqueous medium. The 6-APA may be of any degree of purity and may have been obtained by any known method for preparing 6-APA, such as by the enzymatic hydrolysis of a penicillin or directly by fermentation in a penicillin precursor free medium.

The reaction of the aldehyde and 6-APA (or salt thereof with a base) is preferably conducted in an aqueous medium at a pH of about 3 to about 5 (about 6 to about 8 if a salt is used). If no organic solvent is present the Schiff's base of the aldehyde and 6-APA (or a salt thereof), if water-insoluble, separates either as an oily layer or a crystalline precipitate, depending on the nature of the aldehyde used and whether the 6-APA or a salt thereof is employed as the reactant. In either event, the separated Schiff's base can be recovered from the aqueous medium in which the 6-APA was originally present and further treated as hereinafter described to recover purified 6-APA. To assure complete conversion of the 6-APA to its Schiff's base, a molar excess of the aldehyde is normally used, preferably at least one mole of aldehyde per mole of 6-APA and optimally about two moles being used.

If the reaction is carried out in a mixture of a water-immiscible organic solvent and water, or such water-immiscible organic solvent is subsequently added, the Schiff's base is dissolved in the organic solvent and may be extracted from the original aqueous medium in which the 6-APA was dissolved. The organic solvent extract can then be treated as hereinafter described to recover the 6-APA. Although any water-immiscible organic solvent in which the Schiff's base is soluble can be used, the preferred solvents, because of their higher distribution coefficients, include alkanols of more than three carbon atoms (e.g., n-butanol, amyl alcohol and hexanol), ketones of more than six carbon atoms (e.g., methylcyclohexanone) and chloroform. Other water-immiscible organic solvents which may be used but are not as desirable because of their lower distribution coefficients include methylene chloride, amyl acetate and methyl isobutyl ketone.

The preferred method for converting the Schiff's bases to 6-APA entails dissolving the Schiff's base, if not already dissolved, in a water-immiscible organic solvent, such as one of the solvents mentioned hereinbefore, and adding an amine having a greater affinity for the aldehyde than does 6-APA. One such amine is aniline. The reaction is carried out in the presence of water in a acidic medium (e.g., one at a pH in the range of about 3.5 to about 4.5), whereupon the 6-APA precipitates in crystalline form as the free acid. The recovery may also be made by precipitating the 6-APA from an aqueous water-miscible organic solvent, such as toluene, by acidifying the mixture to a pH of about 2 to about 2.2 by adding an acid, such as a mineral acid.

The following examples illustrate the invention (all temperatures being in centigrade):

EXAMPLE 1

*Salicylidene 6-aminopenicillanic acid*

(A) PREPARATION OF 6-APA (i) *Fermentation.*—One vial of lypholized *Streptomyces azureus* (No. 3705 in the Waksman Collection, Institute of Microbiology, Rutgers University, New Brunswick, New Jersey) mycelium is used to inoculate a 100 ml. portion of the following medium in a 500 ml. Erlenmeyer flask:

Extracted soybean flour _____grams__ 50
Cornsteep liquor _____do____ 8
NaCl _____do____ 5
Tap water to 1 liter.
pH to 7.1; autoclaved at 121° for 20–30 minutes.

The inoculated flask is incubated at 25° with rotary shaking at 280 cycles per minute in a radius of about 2 inches. After three days, a 10% (vol./vol.) transfer is made to 100 ml. of the same medium in a 500 ml. Erlenmeyer flask. The inoculated flask is incubated for five days as described above.

(ii) *Recovery of the enzymes.*—The five day culture described in Step (i) is centrifuged until the cells are completely separated from the liquid portion. The cells are then resuspended in 100 ml. of M/5 borate buffer, pH 8.5, and again recovered by centrifugation.

(iii) *Hydrolysis of penicillin G to 6-APA.*—The cell free supernatant from the culture described in Step (ii) is used as the source of enzymes. Benzyl penicillin is dissolved in borate buffer at pH 8.5 and added directly to the supernatant so that the final concentration of borate is M/5 and benzyl penicillin is 50 mg./ml. The enzyme reaction mixture is incubated at 45° for four hours.

(B) PREPARATION OF SALICYLIDENE 6-APA 250 ml. of the solution of crude 6-APA obtained in Step A, containing 4780 gamma/ml. of 6-APA, is adjusted to pH 3.5 by addition of 40% sodium hydroxide and a solution of 1.5 ml. of salicylaldehyde in 50 ml. of Sextone B (a mixture of the isomers of methylcyclohexanone) is added. Agitation is continued for two hours at room temperature and the solution of the salicylidene 6-APA in the Sextone B is separated.

(C) PREPARATION OF PURIFIED 6-APA

To a solution of the salicylidene 6-APA in Sextone B, obtained in Step B, is added 1.5 ml. of aniline. Crystallization occurs rapidly and after two hours, the crystals are filtered, washed with acetone and dried. Yield: about 600 mg. of 6-APA with an activity of 965 gamma/mg.

EXAMPLE 2

(A) PREPARATION OF SALICYLIDENE 6-APA 200 mg. of a solution of 6-APA, prepared by the method described in Example 1, Step A, and containing 10,230 gamma/ml. of 6-APA, is neutralized with 40% sodium hydroxide to a pH of 3.5 and 2 ml. of salicylaldehyde is added. The mixture is agitated one hour at room temperature and allowed to stand at 5–10° for an additional hour. The oil which forms on the bottom is separated by decantation and centrifugation. This oil is salicylidene 6-APA.

(B) PREPARATION OF PURIFIED 6-APA

The oil obtained in Step A is dissolved in 15 ml. of Sextone B. 2.5 ml. of water and 2 ml. of aniline are added. Rapid crystallization follows and the mixture is allowed to stand in the cold room for one hour. After filtration and drying, about 530 mg. of purified 6-APA is obtained.

EXAMPLE 3

*Phenylethylidene 6-APA*

Following the procedure of Example 2 but substituting an equivalent amount of phenylacetaldehyde for the salicylaldehyde, the phenylethylidene 6-APA is obtained and converted to purified 6-APA.

EXAMPLE 4

*Potassium salt of salicylidene 6-APA*

10 g. of 6-APA is slurried in 100 ml. of water and dissolved by adding 20% potassium hydroxide to pH 8.5. 5.65 g. of salicylaldehyde is then added. Agitation is continued for one hour, after which the solution is freeze dried and the salicylidene derivative recrystallized twice from isopropanol. After drying at 56° under high vacuum over $P_2O_5$, the pure potassium salt of salicylidene 6-APA is obtained.

EXAMPLE 5

*Tert.-alkyl amine salts of salicylidene 6-APA*

(A) PREPARATION OF THE TERT.-ALKYL AMINE SALTS OF SALICYLIDENE 6-APA 700 mg. of the solution of crude 6-APA obtained in Step A of Example 1 is neutralized to pH 7.8 with Primene 81R [Rohm & Haas tertiary alkyl ($C_{12}$–$C_{14}$) amine mixture]. The crude 6-APA solution (3655 gamma/ml.) is then mixed with a solution of 3 ml. of salicylaldehyde in 100 ml. of n-butanol. The reaction is continued over a period of two hours, readjusting the pH to 6.5 when necessary with additional amine. The mixture is separated and the solvent layer containing the tert.-alkyl amine salts of the salicylidene 6-APA is recovered.

(B) PREPARATION OF PURIFIED 6-APA

The solvent layer obtained in Step A is mixed with 3 ml. of aniline. 10 ml. of water is added and the pH adjusted to 4.0 with concentrated hydrochloric acid. The crystalline mixture is allowed to stand overnight at 5–10° and the crystals of 6-APA are filtered and dried. Yield: about 1.42 g. of purified 6-APA.

EXAMPLE 6

*Tert.-octylamine salt of salicylidene 6-APA*

(A) PREPARATION OF THE TERT.-OCTYLAMINE SALT OF SALICYLIDENE 6-APA 500 ml. of a solution of crude 6-APA, prepared by the method described in Example 1, Step A, and containing 4000 gamma/ml. of 6-APA, is adjusted to pH 8.2 with tert.-octylamine and 0.5 ml. of salicylaldehyde is added. Crystallization starts in about 20 minutes and 2.0 ml. of additional salicylaldehyde is added in 0.5 ml. increments every half hour. The mixture is agitated a total of three hours at room temperature and cooled to 5–10° before filtration. After filtration and a 25 ml. water wash, the crystals are dried. Yield: about 4.2 g. of the tert.-octylamine salt of salicylidene 6-APA.

(B) PREPARATION OF PURIFIED 6-APA 2 g. of the product of Step A is dissolved in a mixture of 15 ml. of n-butanol and 7.5 ml. of water. 1 ml. of aniline is added and the solution is gradually acidified to pH 4.0 with concentrated hydrochloric acid. After two hours at room temperature and one hour at 5–10°, the resulting crystals are filtered, washed with absolute ethanol and acetone and dried. Yield: about 0.8 g. of 6-APA (970 gamma/mg.).

In a similar manner, by following the procedure of Step A of Example 6, but using pure 6–APA and substituting an equivalent amount of the indicated aldehyde for the salicylaldehyde, the tert.-octylamine salt of the corresponding Schiff's base of 6–APA is obtained as a crystalline product:

| Example | Aldehyde | Percent Sulfur in Product | |
|---|---|---|---|
| | | Calcd. | Found |
| 7 | p-Chlorobenzaldehyde | 6.68 | 6.56 |
| 8 | Cuminal | 6.58 | 5.9 |
| 9 | 1-Naphthaldehyde | 6.48 | 4.47 |
| 10 | 1-Thiophenealdehyde | 14.2 | 13.28 |

Moreover, by following the procedure of Step A of Example 6, but substituting an equivalent amount of the indicated amine for the tert-octylamine, the corresponding amine salt of salicylidene 6–APA is obtained as a crystalline product:

| Example | Amine | Percent Sulfur in Product | |
|---|---|---|---|
| | | Calcd. | Found |
| 11 | α-Phenethylamine | 6.98 | 5.9 |
| 12 | Benzylamine | 7.2 | 5.4 |

EXAMPLE 13

*Tert.-octylamine salt of salicylidene 6–APA*

One liter of a solution of crude 6–APA, prepared by the method described in Example 1, Step A, and containing 4000 gamma/ml. of 6–APA, is cooled to room temperature and 10 ml. of tert.-octylamine is added slowly while maintaining the pH at 7.5 to 8.0 with concentrated hydrochloric acid. 6 ml. of salicylaldehyde is then added over a period of one hour. Crystallization occurs at this point and the mixture is agitated for an additional two hours. After centrifugation, the crystals are washed with 25 ml. of water and dried. About 8.5 g. of product is obtained with a sulfur content of 6.08% (theoretical 6.85%), corresponding to about 3.5 g. of 6–APA in the Schiff's base.

EXAMPLE 14

(A) PREPARATION OF 6–APA BY FERMENTATION

Following the procedure described by Batchelor et al., Proc. Roy. Soc. (London), 154B, 478–489, 6–APA is obtained in a final concentration of 110 gamma/ml.

(B) PREPARATION OF THE TERT.-OCTYLAMINE SALT OF SALICYLIDENE 6–APA 375 ml. of the product obtained in Step A is neutralized to pH 3.5 with 40% sodium hydroxide and then to pH 8.0 with tert.-octylamine. 1.3 ml. of salicylaldehyde is added in three portions over a period of one and one-half hours at room temperature. Crystallization starts in about one hour and the mixture is agitated for an additional one and one-half hours. After standing overnight at 5–10°, the crystals are filtered, washed with 15 ml. of water and dried. Yield: about 1.08 g. of Schiff's base.

(C) PREPARATION OF PURIFIED 6–APA 750 mg. of the product obtained in Step B is dissolved in a mixture of 4 ml. of water and 6 ml. of n-butanol. 0.4 ml. of aniline is added and the pH is adjusted to 4.0 with concentrated hydrochloric acid. Rapid crystallization occurs and the mixture is agitated at room temperature for four hours. The crystals are filtered, washed with 10 ml. of acetone and dried. About 240 mg. of purified 6–APA are obtained with a potency of about 955 gamma/mg. Overall yield: about 79%.

EXAMPLE 15

5 g. of the Schiff's base obtained in Step B of Example 14 is slurried in a mixture of 10 ml. of water and 10 ml. of toluene. Concentrated hydrochloric acid is added to pH 2.0–2.2 causing the gradual crystallization of 6–APA. After one-half hour, the pH remains constant and the mixture is agitated an additional one-half hour at 5–10°. The product is then filtered and washed with 25 ml. of acetone. Yield: about 1.3 g. of purified 6–APA.

This invention may be variously otherwise embodied within the scope of the appended claims.

What is claimed is:

1. The salt of an alkylamine of more than six carbon atoms and 6-salicylideneaminopenicillanic acid.

2. The tert.-octylamine salt of salicylidene 6-salicylideneaminopenicillanic acid.

3. A process for purifying 6-aminopenicillanic acid, which comprises treating an impure aqueous solution of 6-aminopenicillanic acid with an amine of more than six carbon atoms and an aldehyde of more than four carbon atoms, whereby a precipitate of the amine salt of the Schiff's base of the aldehyde and 6-aminopenicillanic acid is formed, recovering the Schiff's base, and converting it to purified 6-aminopenicillanic acid.

4. A process for purifying 6-aminopenicillanic acid, which comprises treating an impure aqueous solution of 6-aminopenicillanic acid with an amine of more than six carbon atoms and about one mole to about two moles per mole of 6-aminopenicillanic acid of an aldehyde of more than four carbon atoms at a pH of about 6 to about 7, whereby a crystalline precipitate of the amine salt of the Schiff's base of the aldehyde and 6-aminopenicillanic acid is formed, and recovering the precipitate.

5. The process of claim 4 wherein the aldehyde is salicylaldehyde and the amine is tert.-octylamine.

6. The salt of an alkylamine of more than six carbon atoms and the Schiff's base of 6-aminopenicillanic acid and an aldehyde selected from the group consisting of alkanals of more than four carbon atoms; halo, hydroxy, nitro or alkoxy substituted alkanals of more than four carbon atoms; aralkanals; halo, nitro, hydroxy or alkoxy substituted aralkanals; aralkenals; 2-furaldehyde; 2-thiophenealdehyde and pyridine-4-aldehyde.

References Cited by the Examiner

UNITED STATES PATENTS

| 2,647,893 | 8/1953 | Young | 260—239.1 |
| 2,941,995 | 6/1960 | Doyle et al. | 260—239.1 |
| 3,219,669 | 11/1965 | Preud'homme | 260—239.1 |

FOREIGN PATENTS

| 1,286,719 | 1/1962 | France. |

OTHER REFERENCES

Wertheim, Textbook of Organic Chemistry, page 468 (1945).

ALEX MAZEL, *Primary Examiner.*

N. S. RIZZO, HENRY R. JILES, J. W. ADAMS,
*Assistant Examiners.*

PO-1050
(5/69)

UNITED STATES PATENT OFFICE
CERTIFICATE OF CORRECTION

Patent No. 3,288,800            Dated November 29, 1966

Inventor(s) Leon J. Heuser et al.

It is certified that error appears in the above-identified patent and that said Letters Patent are hereby corrected as shown below:

Column 6, line 22, delete "salicylidene" (first occurrence).

SIGNED AND
SEALED
FEB 17 1970

(SEAL)
Attest:

Edward M. Fletcher, Jr.
Attesting Officer

WILLIAM E. SCHUYLER, JR.
Commissioner of Patents